United States Patent [19]
Fountaine

[11] Patent Number: 5,779,400
[45] Date of Patent: Jul. 14, 1998

[54] SMALL-SHANK TOOL FOR AUTOMATIC LATHES

[76] Inventor: William R. Fountaine, 12 Rampart Ct., Holyoke, Mass. 01040

[21] Appl. No.: 632,347

[22] Filed: Apr. 10, 1996

[51] Int. Cl.$^6$ ............................. B23B 27/16; B23B 29/20
[52] U.S. Cl. ..................... 407/103; 407/66; 407/104
[58] Field of Search .......................... 407/66, 102, 103, 407/104, 117

[56] References Cited

PUBLICATIONS

Engineered Tooling Corporation Catalogue, "Mini–Shank Tooling Indexable Inserts", 1990.
Kennametal, Inc., "Lathe Tooling for Swiss Style Turning Centers", Catalog 4004, 1994.
Max Bar™ Brand Catalogue, "Tool Holders and Inserts for CNC 'Swiss–Type' Automatics", 1992.
Micro 100, Inc., "Super Carbide Tools", Catalog 952, 1995.
Tornos Bechler S.A., "General Catalog" (no date).

*Primary Examiner*—Steven C. Bishop
*Attorney, Agent, or Firm*—McCormick, Paulding & Huber

[57] ABSTRACT

In a small-shank cutting tool for a Swiss-type automatic lathe, the tool shank defines a square cross-sectional shape having a width of either 7 mm or 8 mm, and a tool recess defined at one end of the shank by two tool-supporting surfaces oriented at an acute angle relative to each other. A rhomboidal-shaped tool insert of the cutting tool is seated within the tool recess of the shank with two sides of the insert each engaging a respective tool-supporting surface of the shank, and a substantial portion of the other two sides of the insert extending beyond the end of the shank and forming a cutting tip for cutting a workpiece. The rhomboidal-shaped insert defines an inscribed circle having a diameter less than approximately 6 mm, and a fastener aperture extending through the approximate center of the inscribed circle defining a diameter less than that of the inscribed circle, in order to provide sufficient space on the shank to form at least two supporting surfaces for engaging and supporting the rhomboidal insert along a substantial portion of each of two sides. A threaded fastener of the cutting tool extends through the fastener aperture and is threadedly attached to the tool shank for fixedly attaching the tool insert to the tool shank. The threaded fastener is preferably a counter-sunk torque screw, and defines a maximum head diameter less than approximately 70% of the diameter of the inscribed circle in order to maintain sufficient structural integrity of the insert to avoid failure during machining operations.

19 Claims, 2 Drawing Sheets

SMALL-SHANK TOOL FOR AUTOMATIC LATHES

FIELD OF THE INVENTION

The present invention relates to cutting tools for automatic lathes, and more particularly, to such cutting tools having an interchangeable tool insert attached to a shank with the insert defining a generally rhomboidal shape and having a cutting surface extending beyond the tip of the shank for cutting a workpiece, and particularly suited for use with small-shank cutting tools having shanks less than 9 mm in width.

BACKGROUND INFORMATION

In a typical Swiss-type automatic screw machine, a plurality of cutting tools are radially disposed about a sliding headstock for cutting a workpiece which is rotatably and longitudinally driven relative to the tools. The cutting tools are typically comprised of a tool bit or insert attached to a tool holder or shank, and the shanks are selectively actuated to move the tools radially into and out of engagement with a workpiece to cut the workpiece as desired.

The tool shanks are typically made of rectangular-shaped bars which are slidably mounted within corresponding channels formed in a tool turret or gauge plate mounted around or above the headstock. The tool shanks are provided in the following industry-standard widths: 7 mm, 8 mm, 10 mm, 12 mm, 5/16 inch, and 1/2 inch. Most smaller automatic screw machines can accommodate only the 7 and 8 mm width shanks (referred to herein as "small-shank" cutting tools), whereas the larger automatic screw machines use the shanks having widths of 10 mm or larger.

Cutting tools having a shank width of 8 mm or larger are commercially available in several different configurations. In one type, the carbide tool bits are brazed to the ends of the shanks. In another type, interchangeable carbide tool inserts are screwed or clamped to the ends of the shanks. One advantage of the brazed cutting tools, is that they are relatively less expensive to manufacture and the tool bits are strongly secured in place. One advantage of the interchangeable tool inserts, on the other hand, is that the inserts are provided with more than one cutting edge so that when each edge becomes worn, chipped or otherwise requires replacement, the tool insert may be relatively quickly rotated or indexed on the shank by adjusting the fastener or clamp to position a fresh cutting edge of the insert into a cutting position. The clamping mechanisms may provide a secure lock; however, they are relatively bulky and may not always be easily mounted within the screw machines, particularly the machines requiring small-shank tools, and may therefore require additional set-up time and installation expense.

Currently, most cutting tool manufacturers provide the same series of tool inserts for use with each of the respective manufacturer's available shanks. In addition, most manufacturers only provide interchangeable tool inserts for tools having shank widths of 10 mm or larger. For cutting tools having shank widths of less than 10 mm, these manufacturers recommend the use of brazed tools, as described above. One drawback of the brazed tools, however, is that once the tool bits become worn, they must be ground to reform the cutting edges, or the entire tools must be replaced, and the machine must be reset to accept the re-ground tool. The inventor of this application is not aware of any manufacturer that has provided cutting tools with interchangeable inserts for shank widths of less than 8 mm, and he is aware of only one manufacturer that has provided cutting tools with interchangeable inserts for shank widths of 8 mm.

Figure 1:
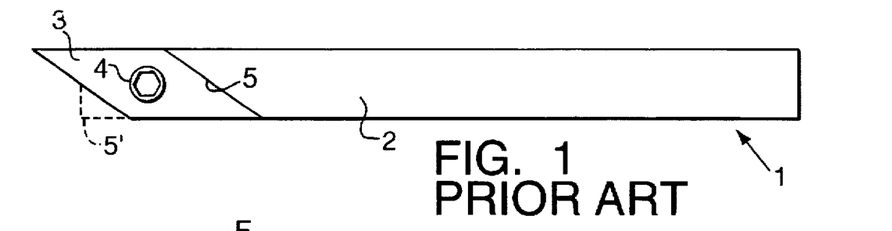
FIG. 1 is a side plan view of a prior art cutting tool having an 8 mm width shank and an interchangeable tool insert.

Referring to FIG. 1, a typical such commercially-available cutting tool is indicated generally by the reference numeral 1. The cutting tool 1 includes a rectangular-shaped shank 2 having a width of 8 mm, and a rhomboidal-shaped (or diamond-shaped) insert 3 attached to one end of the shank by a screw 4. As can be seen, the tool insert 3 is defined by an inscribed circle which is approximately equal to the width of the shank 2 (8 mm), and the shank defines a single tool-supporting edge 5 for engaging and supporting a corresponding edge of the tool insert. One of the problems encountered with this configuration is that if the insert is torqued in the clockwise direction in FIG. 1, the tool insert may become relatively easily dislodged on the shank, thus rendering the cutting tool ineffective and requiring time-consuming breakdown and set-up to either repair or replace the tool.

As illustrated in broken lines in FIG. 1, industry has attempted to overcome this problem by providing the shank with another, smaller supporting edge 5' on the opposite side of the tool insert relative to the first supporting edge 5. However, because of the size and location of the second supporting edge, it provides little additional support and has proven to break away relatively easily, and has otherwise failed to effectively prevent the insert from being dislodged when torqued in the clockwise direction in FIG. 1.

Accordingly, the prior art has failed to provide an acceptable small-shank cutting tool with interchangeable, rhomboidal-shaped tool inserts, and it is an object of the present invention to provide such a cutting tool which overcomes the drawbacks and disadvantages of the above-described prior art.

SUMMARY OF THE INVENTION

The present invention is directed to a small-shank cutting tool for an automatic lathe, comprising a tool shank defining a rectangular cross-sectional shape having a maximum width of less than approximately 9 mm, and preferably either 7 mm or 8 mm, and including a tool recess defined at one end of the shank by two tool-supporting surfaces oriented at an acute angle relative to each other. One of the tool-supporting surfaces is generally parallel to an adjacent side of the shank, and the shank defines an elongated body portion extending between the respective tool-supporting surface and side of the shank having a thickness of at least approximately 1.0 mm for enhancing the structural integrity of the respective tool-supporting surface. A rhomboidal-shaped tool insert of the cutting tool is seated within the tool recess of the shank with two sides of the insert each engaging a respective tool-supporting surface, and a substantial portion of the other two sides of the insert extending beyond the end of the shank and forming a cutting tip for cutting a workpiece. The rhomboidal-shaped insert defines an inscribed circle having a diameter less than approximately 90% of the maximum shank width, and a fastener aperture extending through the approximate center of the inscribed circle defining a diameter less than approximately 70% of the diameter of the inscribed circle. A threaded fastener of the cutting tool extends through the fastener aperture and is threadedly attached to the tool shank for fixedly attaching the tool insert to the tool shank. The threaded fastener defines a counter-sunk head having a maximum diameter less than approximately 70% of the diameter of the inscribed circle, in order to maintain sufficient structural integrity of the insert to avoid failure during machining operations.

One advantage of the present invention is that an interchangeable, rhomboidal-shaped insert may be used with either 7 mm or 8 mm width shanks, and the shank engages and supports such inserts along a substantial portion of two sides of the insert to fixedly secure the insert and prevent the insert from being dislodged or rendered defective in a like manner as encountered with the prior art small-shank cutting tools described above.

Other objects and advantages of the present invention will become apparent in view of the following detailed description and accompanying drawings.

DETAILED DESCRIPTION OF A PREFERRED EMBODIMENT

Figure 2:
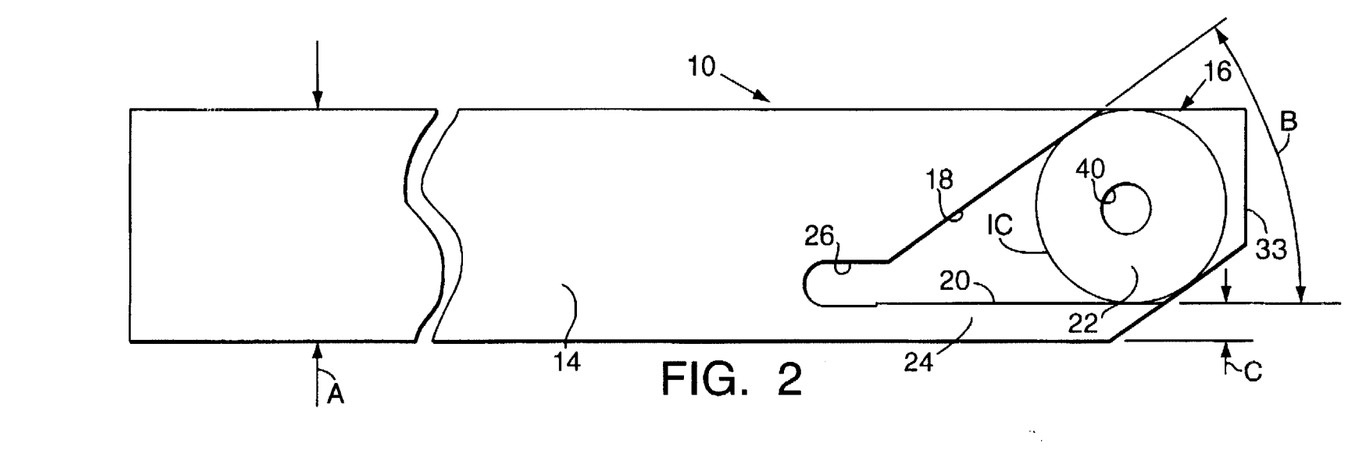
FIG. 2 is a side plan view of a shank or tool holder of a cutting tool embodying the present invention.
Figure 3:
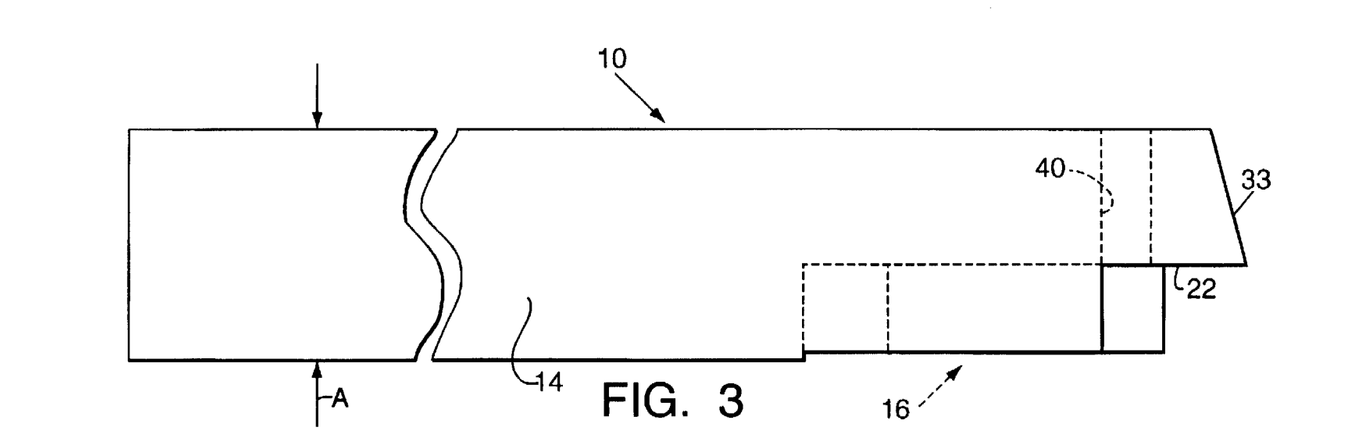
FIG. 3 is a top plan view of the shank of FIG. 2.

In FIGS. 2 and 3, a typical tool holder or shank embodying the present invention is indicated generally by the reference numeral 10. The shank 10 is adapted to hold one or more interchangeable tool inserts, shown typically at 12 FIG. 4, for use in an automatic screw machine, and is particularly suitable for use in "small-shank" screw machines that can only accommodate shanks having widths of less than 9 mm. Currently, the industry standard shank widths for such "small-shank" machines are 7 mm and 8 mm.

As shown in FIG. 2, the shank 10 defines an elongated or longitudinally-extending body 14 having a rectangular cross-sectional configuration. In the embodiment of the present invention illustrated, each of the four sides of the body 14 define an equal width "A" forming a square cross section. One end of the body 14 of the shank defines a tool recess 16 for receiving and supporting a tool insert 12 (FIG. 4), as is described further below. The recess 16 is defined by a first tool-supporting surface 18, a second tool-supporting surface 20, and a base surface 22 extending between the first and second surfaces and oriented normal to these surfaces. As shown in FIG. 2, the first and second tool-supporting surfaces 18 and 20 are oriented at an acute angle "B" relative to each other, and the outermost end of each tool-supporting surface is oriented tangential to an inscribed circle "IC" defined by each tool insert 12 (FIG. 4).

As can be seen in FIG. 2, the first and second tool-supporting surfaces 18 and 20 are positioned on the body 14 so as to define an elongated lip or supporting body section 24 behind the second tool-supporting surface 20 and having a thickness "C". In order to provide adequate support for the tool insert when received in the recess 16 and to otherwise ensure the structural integrity of the cutting tool, the thickness C of the lip 24 is preferably at least approximately 1.0 mm for a shank having a width A of approximately 7 mm, and may be thicker for larger-width shanks. As also shown in FIG. 2, the shank 10 defines a relief pocket 26 formed at the innermost ends of the first and second tool-supporting surfaces 18 and 20.

Figures 4, 5, 6:
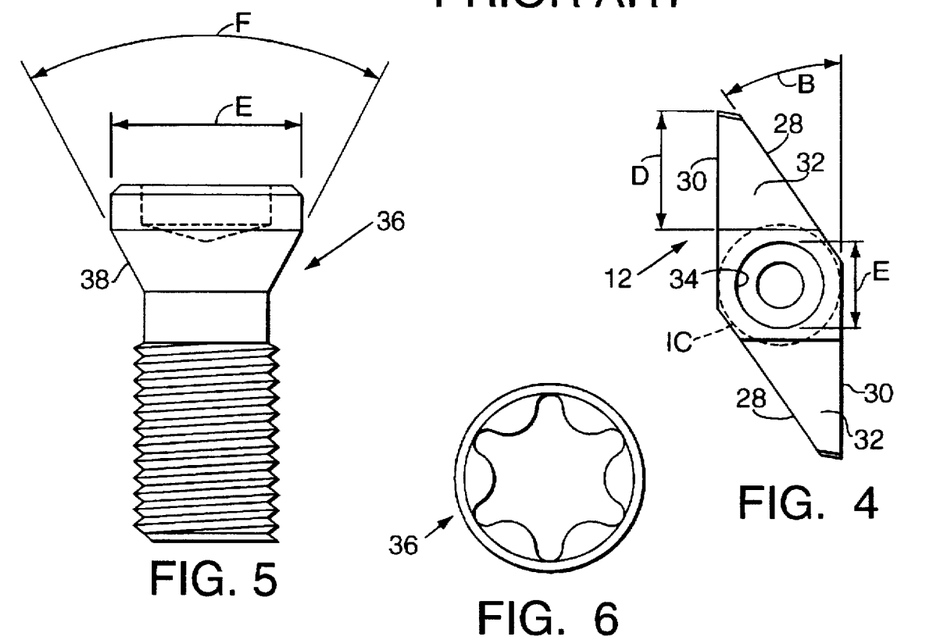
FIG. 4 is a side plan view of an interchangeable tool insert embodying the present invention for attachment to the shank of FIGS. 2 and 3.
FIG. 5 is an elevational view of a threaded fastener embodying the present invention for attaching the interchangeable insert of FIG. 4 to the shank of FIGS. 2 and 3.
FIG. 6 is a top plan view of the threaded fastener of FIG. 5.

Turning to FIG. 4, the interchangeable tool insert 12 has four sides forming a substantially rhomboidal or diamond shape, including two parallel first sides 28 and two parallel second sides 30. Each first side 28 of the insert is oriented at an acute angle B relative to a respective second side 30, and the adjacent pairs of first and second sides each form a respective cutting tip 32 having a depth "D", as shown in FIG. 4. Each cutting tip 32 defines one or more respective cutting edges which are shaped and configured in accordance with the particular type of machining operation to be performed, as is described further below. For example, as shown in FIG. 4, a chamfer is formed at the juncture of each respective pair of first and second surfaces 28 and 30, respectively. The tool insert 12 is preferably made of carbide steel, but may equally be made of other desired materials.

The angle B of the tool insert shown in FIG. 4 is the same as the angle B of the shank shown in FIG. 2 so that when the insert is received within the recess 16 of the shank, the respective first and second surfaces 28 and 30 are seated in conforming engagement with the first and second tool-supporting surfaces 18 and 20 of the shank, respectively, to securely support the insert on two sides. In the embodiment of the present invention illustrated, the angle B is approximately 35°; however, as will be recognized by those skilled in the pertinent art, this angle may changed as desired depending upon the requirements of a particular cutting tool design or other machining system. When the tool insert 12 is received within the recess 16 of the shank, preferably substantially the entire depth D of the respective cutting tip 32 extends beyond the end surface 33 of the shank (FIGS. 2 and 3), as is described further below.

As shown in broken lines in FIG. 4, the insert 12 defines an inscribed circle "IC", which is defined by the diametrical distance between either the opposing first sides 28 or the opposing second sides 30 of the insert. In the embodiment of the present invention illustrated, the tool insert 12 is designed for tool shanks having a width A of 7 mm or greater, and therefore the diameter of the inscribed circle IC is approximately 6 mm. Accordingly, in a shank 10 having a width of 7 mm, the thickness C of the supporting lip 24 is approximately 1 mm, and in larger-width shanks the thickness C may be greater. In accordance with the present invention, for such small-width shanks (i.e., 8 mm or less), the diameter of the inscribed circle IC should be no more than approximately 90% of the width A of the shank, and for 7 mm shanks, the diameter of the inscribed circle IC is preferably approximately 86% or less of the shank width, in order to ensure that the lip 24 has sufficient thickness and structural integrity to fixedly support the tool insert during machining operations. Accordingly, the diameter of the inscribed circle IC is preferably within the range of approximately 5.5 mm to 6.5 mm for shanks having a width within the range of approximately 7 mm to 8 mm.

As also shown in FIG. 4, the tool insert 12 defines a counter-sunk aperture 34 extending through the approximate center of the inscribed circle IC for receiving a threaded fastener 36 (FIG. 5) to fixedly attach the insert to the shank. The counter-sunk aperture 34 defines a maximum diameter E which is sufficiently less than the diameter of the inscribed circle IC of the insert to maintain its structural integrity. As shown in FIG. 5, the threaded fastener 36 is preferably a counter-sunk torque screw defining a maximum head diameter E, which is approximately the same as the maximum diameter E of the counter-sunk aperture 34 of the tool insert. In this embodiment of the invention, wherein the tool insert defines an inscribed circle IC having a diameter of approximately 6 mm, the diameter E should be no more than approximately 4 mm, and is preferably approximately 3.5 mm. However, as will be recognized by those skilled in the pertinent art, the diameter E may be changed as required depending upon the inscribed circle of the insert. In accordance with the present invention, for tool inserts having an inscribed circle IC of approximately 6 mm or less, the diameter E should be no more than approximately 70% of the diameter of the inscribed circle. Similarly, for the insert of the invention wherein the diameter of the inscribed circle IC is within the range of approximately 5.5 mm to 6.5 mm for shank widths within the range of approximately 7 mm to 8 mm, the maximum head diameter E will be within the range of approximately 3 mm to 4.5 mm depending upon the specific minimum shank width and inscribed circle selected.

Also with reference to FIG. 5, in this embodiment of the invention the angle F of the conical-shaped surface 38 of the fastener head is approximately 60° (the "counter-sink angle"); however, as will be recognized by those skilled in the pertinent art, this angle may be changed within limits depending upon the requirements of a particular cutting tool design or other machining system. In accordance with the present invention, the angle F is preferably within the range of approximately 52° to 68° minimize the overall head diameter. As will also be recognized by those skilled in the pertinent art, the surface angle of the counter-sink aperture 34 is selected to substantially match the angle F of the fastener 36 and is preferably configured so that when the fastener is received within the aperture and threadedly engaged with the shank, the top of the fastener is at approximately the same level as the top edge of the aperture.

As shown in FIGS. 2 and 3, the shank 10 defines a threaded bore 40 for threadedly receiving the fastener 36 upon attachment of the tool insert 12 to the shank. The threads of the fastener and bore are preferably relatively fine, and in the preferred embodiment illustrated a "M2.5-4H" thread is employed (2.5 mm pitch×4 threads per mm). Accordingly, the tool insert 12 is seated within the recess 16 of the shank with a respective first side 28 of the insert engaging the first tool-supporting surface 18, and the adjacent second side 30 of the insert engaging the second tool-supporting surface 20 of the shank. The fastener 36 is then inserted through the counter-sunk aperture 34 of the insert and threadedly engaged within the threaded bore 40 of the shank to fixedly secure the insert to the shank.

Figure 7:
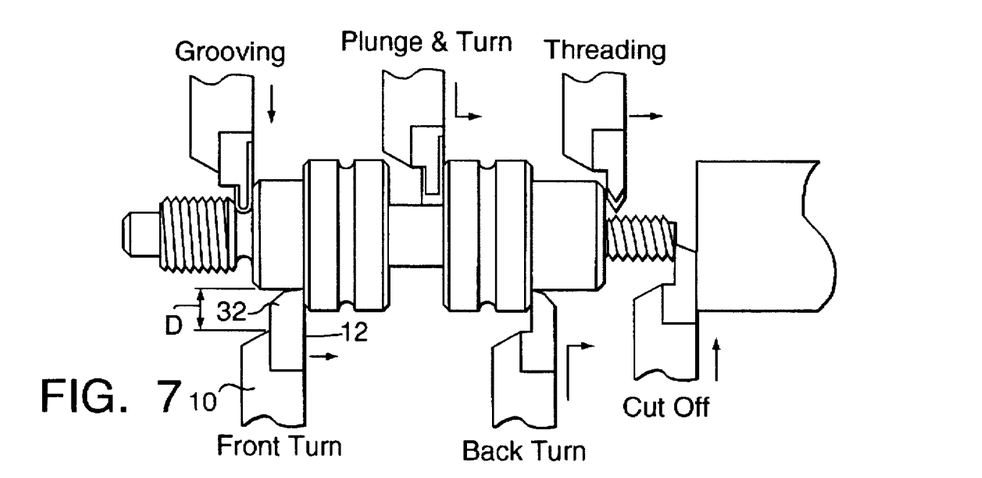
FIG. 7 is a partial-schematic, elevational view of several different configurations of the cutting tool of the present invention illustrating several exemplary types of machining operations that may be performed with the different configurations.

As mentioned above, the cutting tip 32 of each insert 12 may take any of several different shapes and/or configurations, depending upon the type of machining operation to be performed. For example, as shown typically in FIG. 7, the cutting tip 32 of the insert 12 may be ground or otherwise shaped in the several different configurations shown to perform front turning, back turning, cut off, threading, plunge and turning, and grooving operations. On the upper side of the workpiece in FIG. 7, the three exemplary cutting tools of the invention are shown in bottom plan view, whereas on the lower side of the workpiece the three cutting tools are shown in top plan view.

One advantage of the cutting tool of the present invention is that because the diameter of the inscribed circle IC is preferably less than approximately 6 mm, for small-width shanks having a width of 8 mm or less, there is sufficient space to one side of the tool insert when attached to the shank to provide a second tool-supporting surface and lip for engaging and supporting the rhomboidal insert on two sides. Accordingly, the problems associated with the prior art small-shank cutting tools with interchangeable inserts are substantially avoided.

As will be recognized by those skilled in the pertinent art, numerous changes and modifications may be made to the above-described and other embodiments of the present invention without departing from its scope as defined in the appended claims. Accordingly, this detailed description of a preferred embodiment is to be taken in an illustrative, as opposed to a limiting sense.

What is claimed is:

1. A small-shank tool for an automatic lathe, comprising:
   a tool shank defining a rectangular cross-sectional shape and having a maximum width of less than approximately 9 mm, and including a tool recess defined at one end of the shank by two tool-supporting surfaces oriented at an acute angle relative to each other for receiving and supporting a tool insert, wherein one of the tool-supporting surfaces is oriented approximately parallel to an adjacent side of the shank forming an elongated body portion between the tool recess and the respective side of the shank and having a thickness of at least approximately 1.0 mm;
   an approximately rhomboidal-shaped tool insert defined by an inscribed circle having a diameter less than approximately 90% of the shank width, and defining a fastener aperture extending through the approximate center of the inscribed circle having a diameter less than approximately 70% of the diameter of the inscribed circle, the rhomboidal-shaped tool insert being received within the tool recess with two sides of the insert each engaging a respective tool-supporting surface of the shank and a substantial portion of the other two sides of the insert extending beyond the end of the shank and forming a cutting tip for cutting a workpiece; and
   a threaded fastener extending through the fastener aperture and threadedly attached to the tool shank for fixedly attaching the tool insert to the tool shank, the threaded fastener defining a head having a maximum diameter less than approximately 70% of the diameter of the inscribed circle.

2. A small-shank tool as defined in claim 1, wherein the first and second tool-supporting surfaces are oriented at an angle of approximately 35° relative to each other.

3. A small-shank tool as defined in claim 1, wherein the tool shank defines a square cross-sectional shape having a width of either 7 mm or 8 mm.

4. A small-shank tool as defined in claim 1, wherein the inscribed circle has a diameter within the range of approximately 5.5 mm through 6.5 mm and the maximum shank width is within the range of approximately 7 mm through 8 mm.

5. A small-shank tool as defined in claim 1, wherein the maximum shank width is within the range of approximately 7 mm through 8 mm and the maximum head diameter of the threaded fastener is within the range of approximately 3 mm through 4.5 mm.

6. A small-shank tool as defined in claim 5, wherein the threaded fastener is a counter-sunk screw defining a counter-sink angle within the range of approximately 52° through 68°.

7. A small-shank tool as defined in claim 6, wherein the counter-sink angle of the threaded fastener is 60°.

8. A small-shank tool as defined in claim 1, wherein the tool shank defines an approximately planar outer surface extending from the tool recess at one end of the shank to the opposite end of the shank.

9. A small-shank tool as defined in claim 8, wherein the tool insert received within the tool recess defines an approximately planar outer surface substantially coplanar with the outer surface of the tool shank.

10. A small-shank tool for an automatic lathe, comprising:

an axially-elongated tool shank defining a rectangular cross-sectional shape and having a maximum width within the range of approximately 7 mm through 8 mm, and defining at least two substantially straight tool-supporting surfaces oriented at an acute angle relative to each other for supporting a tool insert, wherein one of the tool-supporting surfaces is generally parallel to an adjacent side of the tool shank defining an axially-elongated body portion extending between the respective tool-supporting surface and side of the tool shank having a thickness of at least approximately 1.0 mm for supporting a tool insert engaging the respective tool-support surface;

a generally rhomboidal-shaped tool insert defined by an inscribed circle having a diameter within the range of approximately 5.5 mm through 6.5 mm, and defining a fastener aperture located within the inscribed circle and extending through the insert, wherein the fastener aperture has a maximum diameter within the range of approximately 3 mm through 4.5 mm, and the rhomboidal-shaped insert is mounted on the tool shank with two sides of the rhomboidal insert each engaging a respective tool-supporting surface of the tool shank and a substantial portion of the other two sides of the rhomboidal insert extending beyond the respective end of the tool shank and defining at least one cutting edge for cutting a workpiece; and a counter-sunk fastener extending through the fastener aperture and threadedly attached to the tool shank for fixedly attaching the tool insert to the tool shank, the threaded fastener defining a counter-sunk head having a maximum diameter within the range of approximately 3 mm through 4.5 mm.

11. A small-shank tool as defined in claim 10, wherein the first and second tool-supporting surfaces are oriented at an angle of approximately 35° relative to each other.

12. A small-shank tool as defined in claim 10, wherein the threaded fastener defines a counter-sink angle within the range of approximately 52° through 68°.

13. A small-shank tool as defined in claim 12, wherein the counter-sink angle is 60°.

14. A small-shank tool as defined in claim 10, wherein the tool shank defines an approximately planar outer surface extending from the tool recess at one end of the shank to the opposite end of the shank.

15. A small-shank tool as defined in claim 14, wherein the tool insert received within the tool recess defines an approximately planar outer surface substantially coplanar with the outer surface of the tool shank.

16. A tool insert for a small-shank tool for an automatic lathe, wherein the small-shank tool includes a tool shank having a maximum width of less than approximately 9 mm and a tool recess defined at one end of the shank by two tool-supporting surfaces oriented at an acute angle relative to each other for receiving and supporting the tool insert, wherein one of the tool-supporting surfaces is oriented approximately parallel to an adjacent side of the shank forming an elongated body portion between the tool recess and the respective side of the shank, and defines a thickness of at least approximately 1.0 mm, and the small-shank tool further includes a threaded fastener for fixedly attaching the tool insert to the tool shank; said tool insert comprising:

four sides defining an approximately rhomboidal-shape, said insert defining an inscribed circle having a diameter less than approximately 90% of the shank width, and a fastener aperture extending through the approximate center of the inscribed circle having a diameter less than approximately 70% of the diameter of the inscribed circle, the rhomboidal-shaped insert being receivable within the tool recess of the tool shank with two sides of the insert each engaging a respective tool-supporting surface of the shank and a substantial portion of the other two sides of the insert extending beyond the end of the shank and forming a cutting tip for cutting a workpiece.

17. A tool insert as defined in claim 16, wherein the two sides of the insert engaging the tool-supporting surfaces are oriented at an angle of approximately 35° relative to each other.

18. A tool insert as defined in claim 16, wherein the two sides of the insert extending beyond the end of the shank are oriented at an angle of approximately 35° relative to each other.

19. A tool insert as defined in claim 16, wherein the inscribed circle has a diameter within the range of approximately 5.5 mm through 6.5 mm.

* * * * *

(12) EX PARTE REEXAMINATION CERTIFICATE (6353rd)
United States Patent
Fountaine (10) Number: US 5,779,400 C1
(45) Certificate Issued: Aug. 12, 2008

(54) SMALL-SHANK TOOL FOR AUTOMATIC LATHES

(75) Inventor: William R. Fountaine, Holyoke, MA (US)

(73) Assignee: TBKS, LLC, Waterbury, CT (US)

Reexamination Request:
No. 90/006,360, Aug. 20, 2002

Reexamination Certificate for:
Patent No.: 5,779,400
Issued: Jul. 14, 1998
Appl. No.: 08/632,347
Filed: Apr. 10, 1996

(51) Int. Cl.
*B23P 15/28* (2006.01)
*B26D 1/00* (2006.01)
*B26D 3/00* (2006.01)

(52) U.S. Cl. .......................... 407/103; 407/66; 407/104
(58) Field of Classification Search .................. None
See application file for complete search history.

(56) References Cited

U.S. PATENT DOCUMENTS

| | | | |
|---|---|---|---|
| 3,731,356 A | * | 5/1973 | Gowanlock .................... 407/5 |
| 3,755,868 A | * | 9/1973 | LaForge et al. ............... 407/75 |
| 3,807,007 A | * | 4/1974 | Lindskog .................... 407/105 |
| 3,812,547 A | * | 5/1974 | Reich .......................... 470/80 |
| 4,188,162 A | * | 2/1980 | Zweekly .................... 408/199 |
| 4,714,384 A | * | 12/1987 | Lagerberg .................. 407/103 |
| 5,092,718 A | * | 3/1992 | Shallenberger ............. 408/188 |

FOREIGN PATENT DOCUMENTS

DE          3730589 A1  *  3/1989

OTHER PUBLICATIONS

Mar. 1995 ETCO brochure (Ex. 1).
Aug. 1992 Nikcole brochure (Ex. 4).
Sep. 5, 1993 Kyocera catalog, pp. 5–6, 10–11 (Ex. 6).
1994 Kennametal catalog*, p. 16 (Ex. 8).
1993 ETCO catalog, p. 3 (Ex. 10).
Jan. 1989 ETCO advertisement in Metlfax (Ex. 9), Mar. 1989 ETCO advertisement, Feb. 1990 ETCO advertisement in Automatic Machining.
Stellram Turning Tools with Indexable Inserts—product catalogue—Stelram Societe anonyme, Squizerland/IPM Precision machinery Corp, Elk Grove Village, Illinois.
Tizit Maxilock S, K, P; Turning tools with positive indexable inserts with hole—product catalogue—Plansee Tooling Ltd., England.

(Continued)

*Primary Examiner*—Beverly M Flanagan (57) ABSTRACT

In a small-shank cutting tool for a Swiss-type automatic lathe, the tool shank defines a square cross-sectional shape having a width of either 7 mm or 8 mm. and a tool recess defined at one end of the shank by two tool-supporting surfaces oriented at an acute angle relative to each other. A rhomboidal-shaped tool insert of the cutting tool is seated within the tool recess of the shank with two sides of the insert each engaging a respective tool-supporting surface of the shank, and a substantial portion of the other two sides of the insert extending beyond the end of the shank and forming a cutting tip for cutting a workpiece. The rhomboidal-shaped insert defines an inscribed circle having a diameter less than approximately 6 mm. and a fastener aperture extending through the approximate center of the inscribed circle defining a diameter less than that of the inscribed circle. In order to provide sufficient space on the shank to form at least two supporting surfaces for engaging and supporting the rhomboidal insert along a substantial portion of each of two sides. A threaded fastener of the cutting tool extends through the fastener aperture and is threadedly attached to the tool shank for fixedly attaching the tool insert to the tool shank. The threaded fastener is preferably a counter-sunk torque screw, and defines a maximum head diameter less than approximately 70% of the diameter of the inscribed circle in order to maintain sufficient structural integrity of the insert to avoid failure during machining operations.

OTHER PUBLICATIONS

Carbide Cutting Tools for the 21st Century—product catalogue—American National Carbide Company, Tomball, Texas.

Grooving and Cut–off Tool–Holder with Tungsten Carbide Inserts—product catalogue—Edo Corporation, New York, NY.

Drawing: SMP–35–C7mm, Engineered Tooling Corporation, Boston, MA (1996).

Drawing: SMP–35T–C8mm, Engineered Tooling Corporation, Boston, MA (1994).

Drawing: SMP–35–X7mm, Engineered Tooling Corporation, Boston, MA (1996).

Drawing: SMP–35T–X8mm, Engineered Tooling Corporation, Boston, MA (1994).

* cited by examiner

US 5,779,400 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 16, 17 and 18 are cancelled.

Claims 1, 2, 10 and 11 are determined to be patentable as amended.

Claims 3–9, 12–15 and 19, dependent on an amended claim, are determined to be patentable.

1. A small-shank tool for an automatic lathe, comprising:
a tool shank defining a rectangular cross-sectional shape and having a maximum width of less than [approximately] 9 mm and including a tool recess defined at one end of the shank by two tool-supporting surfaces oriented at an acute angle relative to each other for receiving and supporting a tool insert, wherein one of the tool-supporting surfaces is oriented approximately parallel to an adjacent side of the shank forming an elongated body portion between the tool recess and the respective side of the shank and having a thickness of at least approximately 1.0 mm;
an approximately rhomboidal-shaped tool insert defined by an inscribed circle having a diameter less than approximately 90% of the shank width, and defining a fastener aperture extending through the approximate center of the inscribed circle having a diameter less than approximately 70% of the diameter of the inscribed circle, the rhomboidal-shaped tool insert being received within the tool recess with two sides of the insert each *fully* engaging a respective tool-supporting surface of the shank *without any substantial portion of the two sides extending beyond the respective tool-supporting surfaces,* and *with* a substantial portion of the other two sides of the insert extending beyond the end of the shank and forming a cutting tip for cutting a work piece; and
a threaded fastener extending through the fastener aperture and threadedly attached to the tool shank for fixedly attaching the tool insert to the tool shank, the threaded fastener defining a head having a maximum diameter less than approximately 70% of the diameter of the inscribed circle.

2. A small-shank tool [as defined in claim 1,] *for an automatic lathe, comprising:*
*a tool shank defining a rectangular cross-sectional shape and having a maximum width of less than 9 mm. and including a tool recess defined at one end of the shank by two tool-supporting surfaces oriented at an acute angle relative to each other for receiving and supporting a tool insert, wherein one of the tool-supporting surfaces is oriented approximately parallel to an adjacent side of the shank forming an elongated body portion between the tool recess and the respective side of the shank and having a thickness of at least approximately 1.0 mm;*
*an approximately rhomboidal-shaped tool insert defined by an inscribed circle having a diameter less than approximately 90% of the shank width, and defining a fastener aperture extending through the approximate center of the inscribed circle having a diameter less than approximately 70% of the diameter of the inscribed circle, the rhomboidal-shaped tool insert being received within the tool recess with two sides of the insert each engaging a respective tool-supporting surface of the shank and a substantial portion of the other two sides of the insert extending beyond the end of the shank and forming a cutting tip for cutting a workpiece; and*
*a threaded fastener extending through the fastener aperture and threadedly attached to the tool shank for fixedly attaching the tool insert to the tool shank, the threaded fastener defining a head having a maximum diameter less than approximately 70% of the daimeter of the inscribed circle;*
*wherein the first and second tool-supporting surfaces are oriented at an angle of approximately 35° relative to each other.*

10. A small-shank tool for an automatic lathe, comprising:
an axially-elongated tool shank defining a rectangular cross-sectional shape and having a maximum width within the range of approximately 7 mm through 8 mm, and defining at least two substantially straight tool-supporting surfaces oriented at an acute angle relative to each other for supporting a tool insert, wherein one of the tool-supporting surfaces is generally parallel to an adjacent side of the tool shank defining an axially-elongated body portion extending between the respective tool-supporting surface and side of the tool shank having a thickness of at least approximately 1.0 mm for supporting a tool insert engaging the respective tool-support surface;
a generally rhomboidal-shaped tool insert defined by an inscribed circle having a diameter within the range of approximately 5.5 mm through 6.5 mm, and defining a fastener aperture located within the inscribed circle and extending through the insert, wherein the fastener aperture has a maximum diameter within the range of approximately 3 mm through 4.5 mm, and the rhomboidal-shaped insert is mounted on the tool shank with two sides of the rhomboidal insert each *fully* engaging a respective tool-supporting surface of the tool shank *without any substantial portion of the two sides extending beyond the respective tool-supporting surfaces* and *with* a substantial portion of the other two sides of the rhomboidal insert extending beyond the respective end of the tool shank and defining at least one cutting edge for cutting a workpiece; and
a counter-sunk fastener extending through the fastener aperture and threadedly attached to the tool shank for fixedly attaching the tool insert to the tool shank, the threaded fastener defining a counter-sunk head having a maximum diameter within the range of approximately 3 mm through 4.5 mm.

11. A small-shank tool [as defined in claim 10,] *for an automatic lathe, comprising:*
*an axially-elongated tool shank defining a rectangular cross-sectional shape and having a maximum width within the range of approximately 7 mm through 8 mm,* and defining at least two substantially straight tool-supporting surfaces oriented at an acute angle relative to each other for supporting a tool insert, wherein one of the tool-supporting surfaces is generally parallel to an adjacent side of the tool shank defining an axially-elongated body portion extending between the respective tool-supporting surface and side of the tool shank having a thickness of at least approximately 1.0 mm for supporting a tool insert engaging the respective tool-support surface;

a generally rhomboidal-shaped tool insert defined by an inscribed circle having a diameter within the range of approximately 5.5 mm through 6.5 mm, and defining a fastener aperture located within the inscribed circle and extending through the insert, wherein the fastener aperture has a maximum diameter within the range of approximately 3 mm through 4.5 mm, and the rhomboidal-shaped insert is mounted on the tool shank with two sides of the rhomboidal insert each engaging a respective tool-supporting surface of the tool shank and a substantial portion of the other two sides of the rhomboidal insert extending beyond the respective end of the tool shank and defining at least one cutting edge for cutting a workpiece; and a counter-sunk fastener extending through the fastener aperture and threadedly attached to the tool shank for fixedly attaching the tool insert to the tool shank, the threaded fastener defining a counter-sunk head having a maximum diameter within the range of approximately 3 mm through 4.5 mm, wherein the first and second tool-supporting surfaces are oriented at an angle of approximately 35° relative to each other.

\* \* \* \* \*